(12) United States Patent
Ewert

(10) Patent No.: US 11,340,357 B2
(45) Date of Patent: May 24, 2022

(54) METHOD AND APPARATUS FOR DETECTING A POSITION OF A VEHICLE HAVING A HIGH LEVEL OF AUTOMATION

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/763,122

(22) PCT Filed: Nov. 8, 2018

(86) PCT No.: PCT/EP2018/080642
§ 371 (c)(1),
(2) Date: May 11, 2020

(87) PCT Pub. No.: WO2019/096670
PCT Pub. Date: May 23, 2019

(65) Prior Publication Data
US 2020/0393572 A1    Dec. 17, 2020

(30) Foreign Application Priority Data

Nov. 16, 2017   (DE) ..................... 10 2017 220 483.4

(51) Int. Cl.
*G01S 19/48*   (2010.01)
*G01S 5/00*   (2006.01)
*G01S 19/46*   (2010.01)

(52) U.S. Cl.
CPC ............ *G01S 19/48* (2013.01); *G01S 5/0072* (2013.01); *G01S 19/46* (2013.01)

(58) Field of Classification Search
CPC ........... G01S 19/48; G01S 5/0072; G01S 9/46
(Continued)

(56) References Cited

U.S. PATENT DOCUMENTS

2009/0164118 A1\* 6/2009 Breen ................... G01S 5/0027
701/408
2010/0164789 A1    7/2010 Basnayake
(Continued)

FOREIGN PATENT DOCUMENTS

| JP | 2008-59458 A | 3/2008 |
|---|---|---|
| JP | 2009-145186 A | 7/2009 |

(Continued)

OTHER PUBLICATIONS

International Search Report corresponding to PCT Application No. PCT/EP2018/080642, dated Mar. 7, 2019 (German and English language document) (5 pages).

*Primary Examiner* — Charles N Appiah
*Assistant Examiner* — Frank E Donado
(74) *Attorney, Agent, or Firm* — Maginot, Moore & Beck LLP

(57) ABSTRACT

The disclosure relates to a method for detecting a position of a vehicle having a high level of automation, the method comprising a first reading step, at least one position data signal being read by means of a vehicle-side receiver and the position data signal representing a position of an antenna device of a different vehicle and/or a high building. The method also comprises a determining step, in which a position of the vehicle is determined using the position data signal. Finally, in a provision step, a position signal is provided, using the determined position of the vehicle, to a controller of the vehicle in order to control the vehicle.

19 Claims, 4 Drawing Sheets

(58) Field of Classification Search
USPC ........ 455/456.1; 701/408, 32.4, 41, 45, 495,
701/207, 213, 214, 216
See application file for complete search history.

(56) References Cited

U.S. PATENT DOCUMENTS

| | | | |
|---|---|---|---|
| 2012/0089319 A1 | 4/2012 | Basnayake | |
| 2014/0350848 A1 | 11/2014 | Moerman | |
| 2015/0346722 A1* | 12/2015 | Herz | G05D 1/0027 |
| | | | 701/2 |
| 2016/0023762 A1* | 1/2016 | Wang | G01C 21/3697 |
| | | | 701/3 |
| 2016/0194014 A1* | 7/2016 | Rajendran | H04W 4/46 |
| | | | 701/2 |
| 2016/0363659 A1* | 12/2016 | Mindell | G01S 13/74 |
| 2017/0003395 A1* | 1/2017 | Sasaki | G01S 19/428 |
| 2017/0031031 A1* | 2/2017 | Wagner | G01S 19/40 |
| 2017/0307763 A1* | 10/2017 | Browning | G01S 19/48 |
| 2019/0129431 A1* | 5/2019 | Yalla | G01C 21/00 |
| 2019/0318296 A1* | 10/2019 | Ifill | G05D 1/101 |

FOREIGN PATENT DOCUMENTS

| | | |
|---|---|---|
| JP | 2009-150722 A | 7/2009 |
| JP | 2015-141073 A | 8/2015 |
| WO | 2010/043658 A1 | 4/2010 |

* cited by examiner

METHOD AND APPARATUS FOR DETECTING A POSITION OF A VEHICLE HAVING A HIGH LEVEL OF AUTOMATION

This application is a 35 U.S.C. § 371 National Stage Application of PCT/EP2018/080642, filed on Nov. 8, 2018, which claims the benefit of priority to Serial No. DE 10 2017 220 483.4, filed on Nov. 16, 2017 in Germany, the disclosures of which are incorporated herein by reference in their entirety.

BACKGROUND

The disclosure is based on an apparatus or a method. The subject-matter of the present disclosure is also a computer program.

The position accuracy of a highly automated vehicle depends, among other things, on the number of satellites available. At least four satellites are usually needed to determine the position in space of a highly automated vehicle along with time information. In practice, it may occur that one or more satellites are obscured for a certain period of time from a certain compass direction, for example during a journey of the highly automated vehicle in an urban area through high-rise buildings or when overtaking tall or large vehicles, such as trucks, for example. The satellites cannot be used for the location of the vehicle in space during this period.

SUMMARY

Against this background, with the approach presented here a method for determining a position of a (for example highly automated) vehicle, an apparatus using this method, and finally a corresponding computer program will be presented. The measures listed in the disclosure make advantageous further developments and improvements to the apparatus.

A method for determining a position of a highly automated vehicle, for example, may determine a highly accurate position of the vehicle even in the case of an obscured satellite, since a communication connection between an external road user and/or an external infrastructure having an antenna device transmits the satellite data directly to the vehicle.

A method is presented for determining a position for a highly automated vehicle, for example, wherein the method comprises the following steps:

Reading in at least one position data signal by means of a vehicle receiving device, wherein the position data signal represents a position of an antenna device of a third-party vehicle and/or of a high-rise building;

Determining a position of the vehicle using the position data signal; and

Providing a position signal using the determined position of the vehicle, wherein the position signal is provided to a control device of the vehicle for controlling the vehicle.

A vehicle (for example highly automated) can be a vehicle that can drive without a driver. The vehicle drives autonomously, for example by automatically detecting the course of the road, other road users or obstacles and calculates the corresponding control commands in the vehicle and forwards them to the actuators in the vehicle, whereby the course of travel of the vehicle is correctly influenced. The driver does not participate in driving in a fully autonomous vehicle. A vehicle receiving device may be a device within an apparatus of the, for example, highly automated vehicle for receiving signal data. An antenna device can be a technical device for sending and receiving signal data, for example satellite data. A third-party vehicle may be a vehicle, here in particular a truck, which is located on a road in the immediate vicinity (for example, in the range of 1 to 2 meters) of the (highly automated) vehicle. A high-rise building can be a multi-floor, vertically oriented building with a certain height. A control device may be a device of the vehicle for influencing the direction of travel of the highly automated vehicle.

According to one embodiment, in the determination step the vehicle can determine its position by means of a measured distance and/or by means of a measured transition time of a signal of a communication connection between the vehicle and the antenna device of the third-party vehicle and/or of the high-rise building. Such an embodiment of the approach presented here offers a possibility of a technically very easily implemented determination of the position of the vehicle.

According to one embodiment, satellite data can be read in the reading step that represent a position of the vehicle, wherein in the determination step the position of the vehicle represented by the satellite data is corrected using the position data signal. Such an embodiment of the approach presented here offers the advantage that by the use of the satellite data a rough position of the vehicle is already known, which can then be made precise by using the information of the position data signal. In this way, rapid and robust detection of the position of the vehicle can be carried out.

Furthermore, according to one embodiment time information for each position data signal can be read in the reading step, which represents a time at which the position was determined, wherein the position of the vehicle is determined using the time information in the determination step. Such an embodiment of the approach presented here offers the advantage, for example, of being able to detect outdated position data signals in order to avoid or identify position jumps that are hazardous for driving behavior in determining the position of the vehicle. This can be done, for example, by comparing the time information when determining the position of the vehicle with a reference time, in particular that represents the current time.

According to one embodiment, in the determination step the position of the vehicle can be determined using a triangulation method, in particular wherein the triangulation method is carried out using a transmission of the antenna position to the vehicle and/or transition time information of a transmission path between the antenna device and the vehicle. Such an embodiment of the approach presented here offers the advantage of using already tried and tested algorithms that are technically rapid and easy to implement for determining the position of the vehicle.

According to one embodiment, a position of the vehicle may be determined in the determination step, which deviates from a previously determined position of the vehicle by no more than a threshold value. In this way, a falsification of the position of the vehicle by any position jump can be prevented or at least detected.

According to one embodiment, in the reading step the vehicle can receive the at least one position data signal from the antenna device of a truck and/or a high-rise building, in particular wherein at least one satellite for determining the position of the vehicle is obscured if the truck and/or the high-rise building exceeds a predetermined height and/or if at least one position data signal is read in. Such an embodiment of the approach presented here offers the advantage that the position of the vehicle can be determined if a baseline data base becomes inaccurate, for example by a satellite being obscured. For example, the method presented here cannot be used in a case where satellites required for positioning can be detected or whose signal is usable. In this way, the position data signal can only be used in those cases where a more accurate position determination of the vehicle is not possible by the evaluation of the data of a satellite positioning system with sufficient accuracy alone. This increases the robustness of the position detection method when using the approach presented here, whereby the reliability of the vehicle's driving function is increased in turn.

Advantageously, a vehicle position of the highly automated vehicle can be determined even in the case of an obscured satellite. An overtaking maneuver of the highly automated vehicle can be carried out, wherein the highly automated vehicle regulates its distance from a third-party vehicle in such a way that there is no collision and the third-party vehicle is able to perform a highly accurate position determination, which is transmitted to the highly automated vehicle by means of a position data signal together with time information. In this way, road safety can be increased, because position jumps of the highly automated vehicle in the event of suddenly obscured satellites are minimized.

This method can be implemented, for example, in software or hardware or in a mixture of software and hardware in a control unit, for example.

The approach presented here also creates an apparatus that is designed to carry out, control or implement the steps of a variant of a method presented here in appropriate devices. Also, the object underlying the disclosure can be achieved quickly and efficiently by this exemplary variant of the disclosure in the form of an apparatus.

For this purpose, the apparatus can have at least one computing unit for processing signals or data, at least one memory unit for storing signals or data, at least one interface to a sensor or actuator for reading in sensor signals from the sensor or for outputting data or control signals to the actuator and/or at least one communication interface for reading in or outputting data embedded in a communication protocol. The computing unit can be a signal processor, a microcontroller or the like, for example, wherein the memory unit can be a flash memory, an EEPROM or a magnetic memory unit. The communication interface may be designed to read in or output data wirelessly and/or by wire, wherein a communication interface that can read in or output data by wire, for example, can read in said data electrically or optically from a corresponding data transmission line or can output it into a corresponding data transmission line.

An apparatus can be understood in the present case to be an electrical device, which processes the sensor signals and depending thereon outputs control and/or data signals. The apparatus may have an interface that can be of a hardware and/or software form. In the case of a hardware embodiment, the interfaces can be, for example, part of a so-called system ASIC, which contains various functions of the device. However, it is also possible that the interfaces are separate integrated circuits or at least partly consist of discrete components. In a software embodiment, the interfaces can be software modules that can be installed on a microcontroller, for example, in addition to other software modules.

A computer program product or computer program with program code is also advantageous, which may be stored on a machine-readable medium or a memory medium such as a semiconductor memory, a hard disk memory or an optical memory and which is used to perform, implement and/or control the steps of the method according to one of the embodiments described above, in particular when the program product or program is executed on a computer or an apparatus.

BRIEF DESCRIPTION OF THE DRAWINGS

Exemplary embodiments of the approach presented here are illustrated in the drawings and explained in more detail in the following description. In the figures.

DETAILED DESCRIPTION

Figure 1:
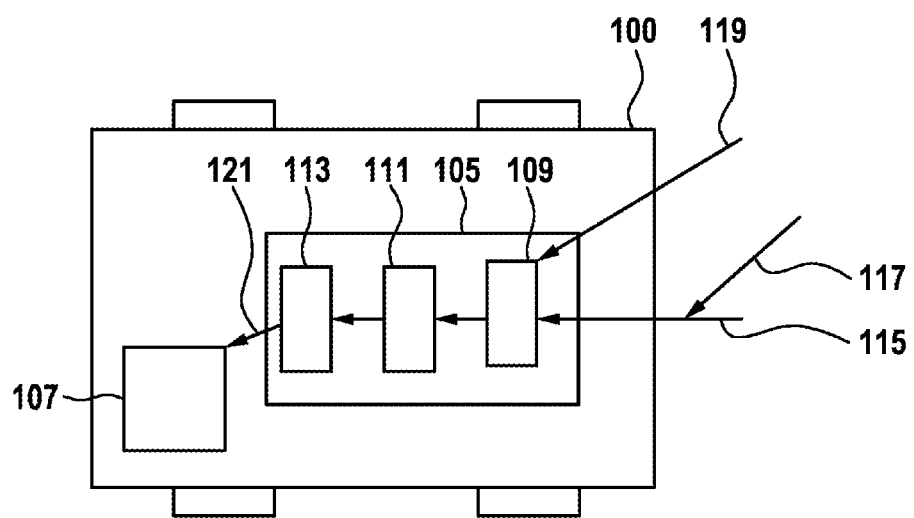
FIG. 1 shows a schematic view of a highly automated vehicle with a device according to an exemplary embodiment.

In the following description of advantageous embodiments of the present disclosure, the same or similar reference characters are used for the similarly acting elements represented in the various figures, wherein a repeated description of these elements is dispensed with.

FIG. 1 shows a schematic view of a highly automated vehicle 100 with an apparatus 105 according to an exemplary embodiment. The apparatus 105 is designed to carry out and/or control the method for determining a position for the (for example highly automated) vehicle 100.

In addition to the apparatus 105, the vehicle comprises a control device 107 for influencing the direction of travel of the highly automated vehicle 100. The apparatus 105 itself comprises a vehicle receiving device 109, a vehicle sensor device 111 and a providing device 113. According to one exemplary embodiment, the vehicle sensor device 111 is a vehicle motion-and-position sensor. The vehicle sensor device 111 can be used for highly automated driving and calculates a highly accurate vehicle position with the help of navigation satellite data, such as GPS, GLONASS, Beidou and/or Galileo. Moreover, correction data from so-called correction services are used in the vehicle sensor device 111 to calculate the position of the vehicle 100 even more precisely. Moreover, wheel speeds and steering angles from other vehicle sensors as well as data from acceleration and rotation rate sensors are used in the vehicle sensor device 111 to calculate the position of the vehicle 100 even more precisely.

The vehicle receiving device 109 is designed to read in at least one position data signal 115. The position data signal 115 represents a position of an antenna device of a third-party vehicle and/or of a high-rise building. Furthermore, for each position data signal 115, for example, time information 117 is read in, which represents a time at which the position of the external vehicle and/or the high-rise building was determined. The vehicle receiving device 109 is further designed to read a plurality of satellite data 119 items in addition to the position data signal 115 with the time information 117, wherein the satellite data 119 represent a position of the vehicle 100 or a position of the vehicle 100 can be derived from the satellite data 119. The vehicle sensor device 111 is designed to determine a position of the vehicle 100 using the position data signal 115 and the time information 117. The position of the vehicle 100 represented by the satellite data 119 is corrected using the position data signal 115 with the time information 117. Furthermore, the vehicle sensor device 111 is designed to determine the position of the vehicle 100 using a triangulation method, wherein the triangulation method is carried out using a transmission of the antenna position of a third-party vehicle and/or a high-rise building to the vehicle 100 and/or by means of transition time information of a transmission path of a signal between the antenna device and the vehicle 100. Finally, the providing device 113 is designed to provide a position signal 121 using the determined position of the vehicle 100. The position signal 121 is provided to the control device 107 of the vehicle 100 for controlling the vehicle 100.

Figure 2:
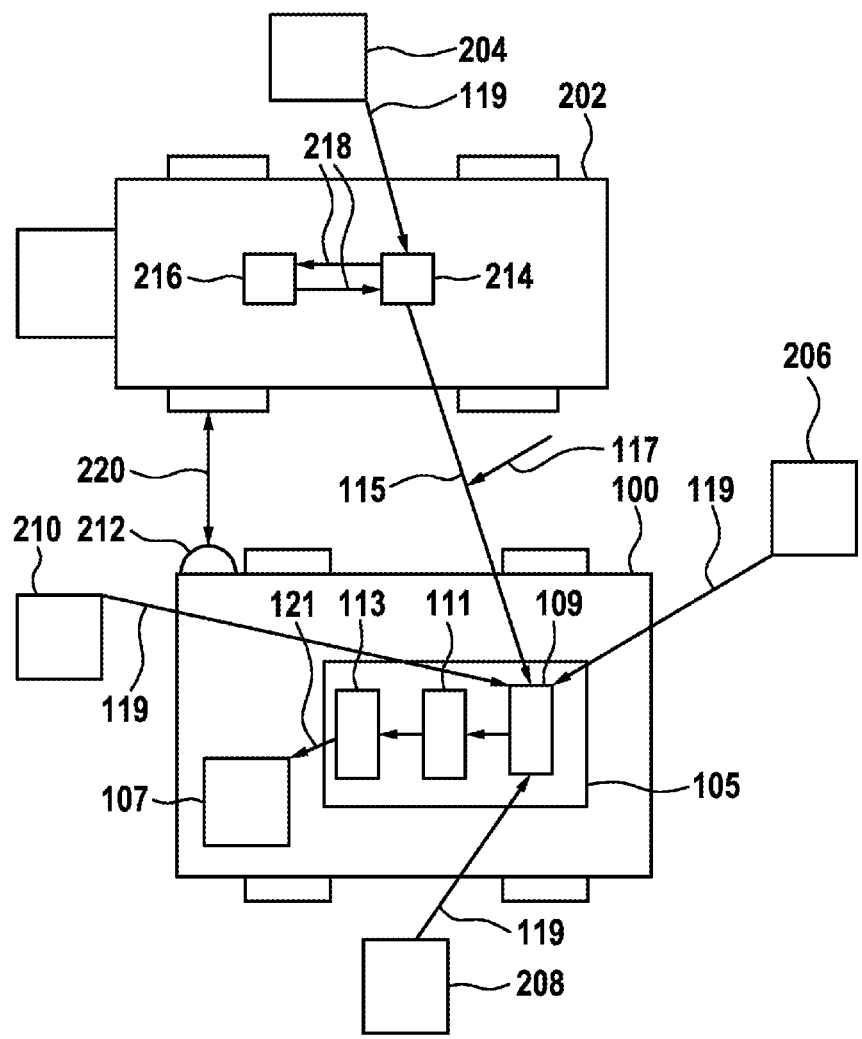
FIG. 2 shows a schematic view of a system structure of a method for determining a position for a highly automated vehicle according to an exemplary embodiment.

FIG. 2 shows a schematic view of a system structure for using a method for determining a position for a highly automated vehicle 100 according to an exemplary embodiment. The structure comprises the highly automated vehicle 100, for example according to the one in the exemplary embodiment illustrated in FIG. 1, a third-party vehicle 202, wherein according to one exemplary embodiment this is a truck 202, and at least four satellites 204, 206, 208 and 210. The vehicle 100 itself comprises the apparatus 105 for carrying out the method for determining a position for the vehicle 100, with the vehicle receiving device 109, the vehicle sensor device 111 and the providing device 113. In addition, the vehicle comprises the control device 107 as well as an environment sensor 212 for distance measurement. In addition to an antenna device 214, the truck 202 also comprises a vehicle sensor device 216.

The position accuracy of the vehicle sensor device 111 depends, among other things, on the number of available satellites. According to one exemplary embodiment, at least four satellites, 204, 206, 208 and 210 are needed to determine the position of the vehicle 100 in space together with time information. In practice, it can occur that one or more satellites of a certain point of the compass may be obscured by a high vehicle, for example a truck 202, for a certain period of time, for example during an overtaking maneuver of the vehicle 100. The obscured satellites cannot be used for the location of the vehicle 100 in space during this period. If, on the other hand, the different compass directions are clearly visible, the position determination for the vehicle 100 can be carried out with high precision using the available satellites 204, 206, 208 and 210. However, an already highly precisely determined position of the vehicle 100 can jump as soon as at least one satellite, for example the satellite 204, is suddenly obscured by an obstacle, for example the truck 202. In this case, it is the aim to prevent such a falsification of the position of the vehicle 100 and thus to increase road traffic safety.

First, the first scenario is considered by briefly interrupting a clear view of the satellite 204. This is the case, for example, during overtaking the truck 202 by the highly automated vehicle 100.

In such a case, the position of the vehicle 100 in space is briefly shifted to the left in the direction of travel, since the satellite 204 on the right side of the vehicle 100 is obscured by the high truck 202. To prevent this, two conceivable embodiments are used:

In a first embodiment, the satellite 204 sends its satellite data 119 to the antenna device 214 of the truck 202. Subsequently, position information of the truck 202 based on the satellite data 119 is transmitted directly to the vehicle receiving unit 109 of the vehicle 100 in the form of the position data signal 115 by means of the antenna device 214 of the truck 202. Here the position data signal 115 represents a position of the antenna device 214 of the truck 202. The transmission of the position data signal 115 is realized according to one exemplary embodiment via a communication connection between the vehicle 100 and the antenna device 214 of the truck 202. A communication connection is understood here to mean a wireless exchange of information and data between the vehicle 100 and another unit capable of receiving information and data. According to one exemplary embodiment, this unit may be a third-party vehicle, for example the truck 202, and/or an infrastructure, such as a high-rise building for example. The aim of this data exchange is to report critical and dangerous situations to the driver of the highly automated vehicle 100 in a timely manner. Furthermore, vehicle-specific data can be exchanged between the vehicles 100 and 202 and/or the units via this interface. The transmission of the position data signal 115 is carried out in real time even before the processing of the satellite data 119 takes place within the vehicle sensor device 216 of the truck 202. In order to also take into account the transition time of the communication connection between the vehicle 100 and the antenna device 214 of the truck 202, the position data signal 115 is read in together with the time information 117, wherein the time information 117 represents a time at which the position of the truck 202 was determined. After the reception of the position data signal 115 by the vehicle receiving device 109 of the vehicle 100, the position data signal 115 is forwarded to the vehicle sensor device 111 and is evaluated within the vehicle sensor device 111, wherein the position of the vehicle 100 represented by the satellite data 119 is corrected using the position data signal 115. Furthermore, a time-shift of the satellite data 119 during transmission from the truck 202 to the vehicle 100 is taken into account in the evaluation of the vehicle sensor device 111 by comparing the time information 117 of at least two read-in position data signals 115. Here, a position of the vehicle 100 is determined, which deviates from a previous specified position of the vehicle 100 by no more than a threshold value. In this way, the position of the vehicle 100 during the overtaking maneuver can be corrected and finally determined so that there are no local jumps of the vehicle 100 in a certain direction. Finally, using the determined position of the vehicle 100 the providing device 113 provides a position signal 121 to the control device 107 of the vehicle 100 for controlling the vehicle 100 safely.

It is also conceivable that the truck 202 does not transmit the satellite data 119 via the communication connection between the vehicle 100 and the antenna device 214 of the truck 202, but via a small GPS transmitter (not shown), so that the highly automated vehicle 100 can receive satellite data 119 directly in a GPS receiver (not shown). However, the satellite data 119 would be specially marked, for example as correction data, in order to be able to distinguish it from the GPS data of the non-obscured satellites 206, 208 and 210.

In a second embodiment, the truck 202 determines its position using a position determination signal 218, wherein the position determination signal 218 is read in by the vehicle sensor device 216 of the truck 202, is processed there and finally provided to the antenna device 214 of the truck 202. According to one exemplary embodiment, the vehicle sensor device 216 of the truck 202 is also a vehicle motion-and-position sensor. Subsequently, the truck 202 transmits its position in the form of the position data signal 115 to the highly automated vehicle 100, wherein this process is carried out using the communication connection between the highly automated vehicle 100 and the antenna device 214 of the truck 202. By means of the environment sensor 212 installed in the vehicle 100 and/or by using a transition time of the communication connection between the highly automated vehicle 100 and the antenna device 214 of the truck 202, the vehicle 100 determines its lateral distance 220 from the truck 202. This lateral distance 220 is now added to the received truck position information within the vehicle sensor device 111 of the vehicle 100 during the overtaking maneuver. As a result, the vehicle 100 position, which has already been calculated in the vehicle sensor device 111 but is falsified, can be corrected. This process takes place until the overtaking maneuver is completed and all four satellites 204, 206, 208 and 210 are again available for the vehicle's 100 own position determination. This embodiment of the method for determining a position for the highly automated vehicle 100 can also be referred to as a guided overtaking maneuver.

It is reasonable to conceive of a combination of the first and second embodiments of the method.

Figure 3:
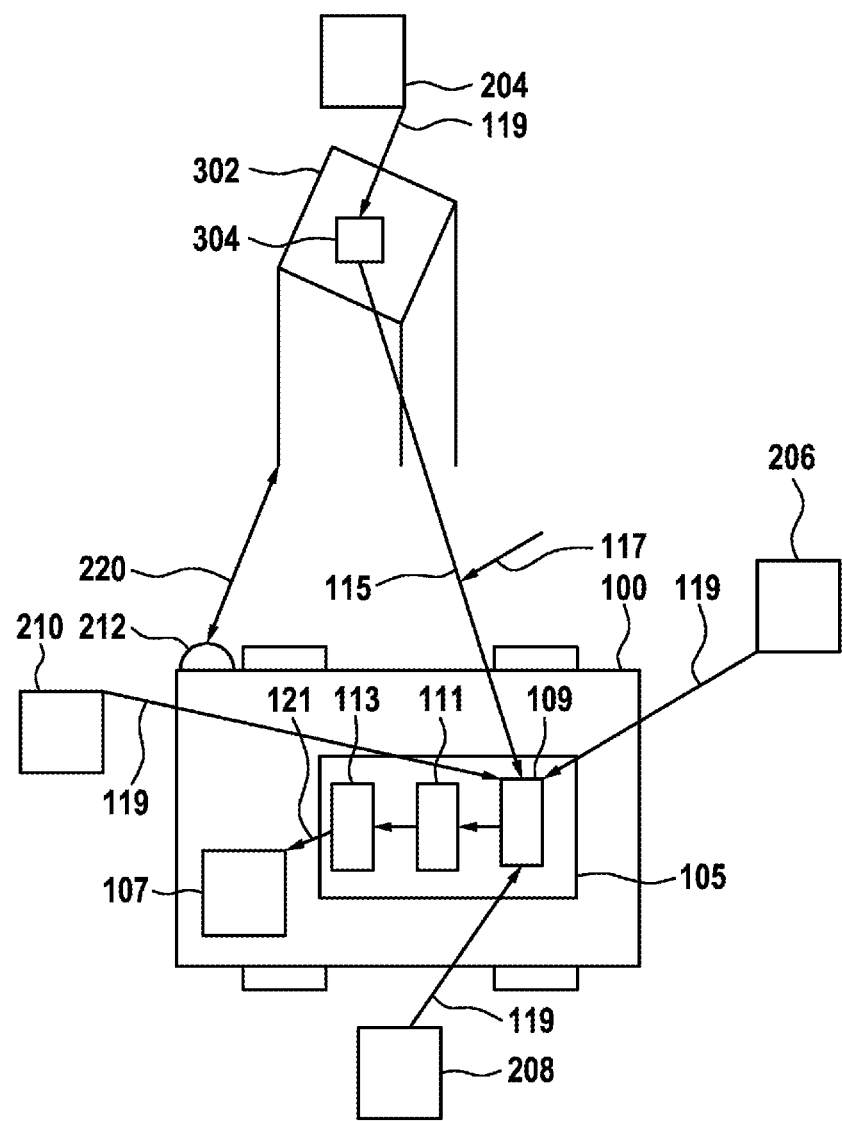
FIG. 3 shows a schematic view of a system structure of a method for determining a position for a highly automated vehicle according to an exemplary embodiment.

FIG. 3 shows a schematic view of a system structure for using a method for determining a position for a highly automated vehicle 100 according to an exemplary embodiment. The structure comprises the highly automated vehicle 100, a high-rise building 302 and at least four satellites 204, 206, 208 and 210. The vehicle 100 itself comprises the apparatus 105 for carrying out the method for determining a position for the vehicle 100, with the vehicle receiving device 109, the vehicle sensor device 111 and the providing device 113. Furthermore, the vehicle 100 comprises the control device 107 as well as the environment sensor 212. The high-rise building 302 comprises an antenna device 304 for receiving as well as for transmitting the satellite data 119 to the highly automated vehicle 100.

The position accuracy of the vehicle sensor device 111 depends, among other things, on the number of available satellites. According to an exemplary embodiment, at least four satellites 204, 206, 208 and 210 are required to determine the position of the vehicle 100 in space together with time information. In practice, it can occur that one or more satellites of a certain compass direction are obscured for a certain period of time, for example by one or more high-rise buildings 302 during a vehicle 100 journey in an urban area. These satellites cannot be used for the location of the vehicle 100 in space during this period. If, on the other hand, the different compass directions are clearly visible, the position determination for the vehicle 100 can be carried out with high precision using the available satellites 204, 206, 208 and 210. However, an already highly precisely determined position of the vehicle 100 can jump as soon as at least one satellite, for example the satellite 204, is suddenly obscured by an obstacle, for example the high-rise building 302. It is the aim to prevent such a falsification of the position of the vehicle 100 and thus to increase road traffic safety.

The second conceivable scenario concerns a journey of the vehicle 100 in an urban area. In this case, the high-rise building 302 obscures the view of the vehicle 100 to the satellite 204. The high-rise building 302 has the antenna device 304 for receiving satellite data 119. The position information of the high-rise building 302 based on the satellite data 119 is transmitted directly to the vehicle receiving device 109 of the vehicle 100 by the antenna device 304 of the high-rise building 302 in the form of the position data signal 115 with the time information 117, wherein this process is carried out using a communication connection between the highly automated vehicle 100 and the antenna device 304 of the high-rise building 302. In order to also take into account the transition time of the communication connection between the vehicle 100 and the antenna device 304 of the high-rise building 302, the position data signal 115 is read in together with the time information 117, wherein the time information 117 represents a time at which the position of the high-rise building 302 was determined. After the reception of the position data signal 115 by the vehicle receiving device 109, the position data signal 115 is forwarded to the vehicle sensor device 111 and is evaluated within the vehicle sensor device 111 of the apparatus 105, wherein the position of the vehicle 100 represented by the satellite data 119 is corrected and determined using the position data signal 115 and the time information 117. A determination of the position of the vehicle 100 is carried out here in particular by using a triangulation method. The triangulation method is carried out using a transmission of the position of the antenna device 304 of the high-rise building 302 to the vehicle 100 and/or using transition time information of a transmission path between the antenna device 304 of the high-rise building 302 and the vehicle 100. Furthermore, a time shift of the satellite data 119 during the transmission from the high-rise building 302 to the vehicle 100 is taken into account in the evaluation of the vehicle sensor device 111 for determining the position of the vehicle 100 by a comparison of the time information 117 of at least two read-in position data signals 115. Here, a position of the vehicle 100 is determined, which deviates from a previously determined position of the vehicle 100 by no more than a threshold value. In this way, the position of the vehicle 100 during the journey through the urban area can be corrected and finally determined, so that there are no local jumps of the vehicle 100 in a certain direction. The providing device 113 then provides the position signal 121, using the determined position of the vehicle 100, to the control device 107 of the vehicle 100 for controlling the vehicle 100 safely.

Furthermore, the vehicle 100 can determine its distance 220 from the high-rise building 302 by means of the environment sensor 212 installed in the vehicle 100 and/or by using a transition time of the communication connection between the highly automated vehicle 100 and the antenna device 304 of the high-rise building 302. This distance 220 is now added to the received high-rise building position information within the vehicle sensor device 111 of the vehicle 100 during the vehicle 100 journey. As a result, the position of the vehicle 100 already calculated in the sensor device 111 but falsified can be corrected. This process is carried out until the vehicle 100 has passed the high-rise building 302 and all four satellites 204, 206, 208 and 210 are again available for the vehicle's 100 own position determination. This exemplary embodiment of the method for determining a position for the highly automated vehicle 100 can also be referred to as a managed pass of a structural device.

Figure 4:
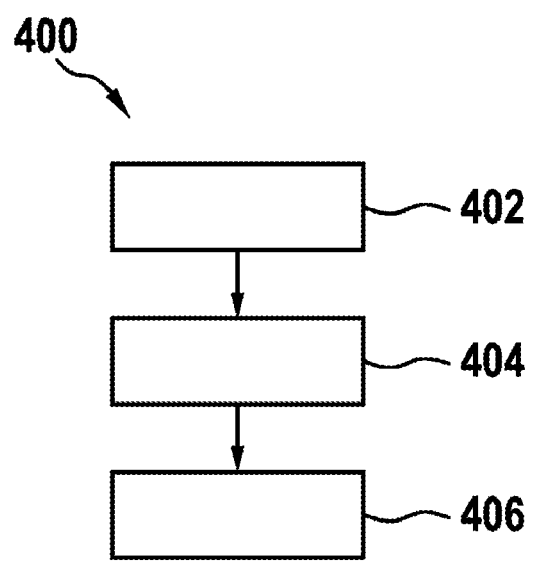
FIG. 4 shows a flowchart of an exemplary embodiment of a method for determining a position for a highly automated vehicle according to an exemplary embodiment.

FIG. 4 shows a flowchart of an exemplary embodiment of a method for determining a position for a highly automated vehicle according to an exemplary embodiment.

In a step 402, at least one position data signal is read in by means of a vehicle receiving device, wherein the position data signal represents a position of an antenna device of a third-party vehicle and/or a high-rise building. Furthermore, in a step 404 a position of the vehicle is determined using the position data signal. Finally, in a step 406 a position signal, using the determined position of the vehicle, is provided to a control device of the vehicle for controlling the vehicle.

If an exemplary embodiment has an "and/or" link between a first feature and a second feature, this shall be read in such a way that according to one embodiment the exemplary embodiment has both the first feature and the second feature and according to a further embodiment has either only the first feature or only the second feature.

In a further exemplary embodiment, the data 115 of a satellite X are only read in by the antennas 204/304 if the signal/noise ratio of the directly received saddle data 119 of satellite X is less than a low value. Then this satellite is no longer taken into account in the conventional position calculation, but the data 115 are used instead. Thus, the data 119 is expected to be used for as long as possible before switching to 115 to save running time on the apparatus 111.

The invention claimed is:

1. A method for determining a corrected position for a vehicle, comprising:
   reading in at least one position data signal using a vehicle receiving device, wherein the at least one position data signal represents a position of an antenna device of one or more of a third-party vehicle and a high-rise building;
   reading in satellite data that represent a satellite-based position of the vehicle;
   determining a satellite used for reading in the satellite data is obscured based on at least one of a height of the third-party vehicle and a height of the high-rise building;
   determining the corrected position of the vehicle by correcting the satellite-based position of the vehicle based on the read-in at least one position data signal when the satellite used for reading in the satellite data is obscured;
   providing a position signal to a control device of the vehicle based on the corrected position of the vehicle; and
   controlling the vehicle according to the provided position signal.

2. The method as claimed in claim 1, wherein determining the corrected position of the vehicle comprises:
   determining a measured distance using the read-in at least one position data signal; and
   correcting the satellite-based position of the vehicle based on the measured distance.

3. The method as claimed in claim 1, further comprising:
   reading in time information, which represents a time at which the position of the antenna device was determined,
   wherein determining the corrected position of the vehicle further comprises correcting the satellite-based position of the vehicle using the time information.

4. The method as claimed in claim 1, wherein determining the corrected position of the vehicle comprises:
   determining a signal-based position of the vehicle based on the read-in at least one position data signal using a triangulation method,
   correcting the satellite-based position of the vehicle based on the signal-based position of the vehicle,
   wherein the triangulation method is carried out using at least one of a transmission of the position of the antenna to the vehicle, and transition time information of a transmission path of a signal between the antenna device and the vehicle.

5. The method as claimed in claim 1, wherein determining the corrected position of the vehicle comprises:
   determining the corrected position of the vehicle to be a position which deviates from a previously determined position of the vehicle by no more than a threshold value.

6. The method of claim 1, wherein determining the corrected position of the vehicle comprises:
   determining the corrected position of the vehicle by executing a computer program.

7. The method of claim 6, wherein determining the corrected position of the vehicle comprises:
   executing the computer program with a controller by executing control commands stored in a non-transitory machine-readable memory medium.

8. The method as claimed in claim 1, wherein determining the corrected position of the vehicle comprises:
   determining the corrected position of the vehicle using a measured transition time of a signal of a communication connection between the vehicle and the antenna device.

9. The method as claimed in claim 8, wherein determining the corrected position of the vehicle comprises:
   determining the corrected position of the vehicle using a measured distance and the measured transition time of the signal of the communication connection between the vehicle and the antenna device.

10. The method as claimed in claim 1, wherein the building is a multi-floor, vertically-oriented building.

11. A method for determining a position of a vehicle, comprising:
    determining at least one of a height of a third-party vehicle and a height of a high-rise building;
    determining at least one satellite for determining the position of the vehicle is obscured when at least one of (i) the determined height of the third-party vehicle exceeds a first predetermined height, and (ii) the determined height of the high-rise building exceeds a second predetermined height;
    reading in at least one position data signal using a vehicle receiving device when it is determined that the at least one satellite is obscured, the at least one position data signal representing a position of an antenna device of one or more of the third-party vehicle and of the high-rise building;
    determining the position of the vehicle using the read-in at least one position data signal when the at least one satellite is obscured;
    providing a position signal to a control device of the vehicle using the determined position of the vehicle; and
    controlling the vehicle with the provided position signal.

12. The method as claimed in claim 11, wherein determining the position of the vehicle comprises:
    determining the position of the vehicle using a triangulation method,
    wherein the triangulation method is carried out using the transmission of the position of the antenna to the vehicle and transition time information of the transmission path of the signal between the antenna device and the vehicle.

13. The method as claimed in claim 11, wherein determining the position of the vehicle comprises:
    determining the position of the vehicle using a measured distance.

14. The method as claimed in claim 11, further comprising:

reading in time information, which represents a time at which the position of the antenna device was determined, wherein determining the position of the vehicle further comprises determining the position of the vehicle using the time information.

15. The method as claimed in claim 11, wherein determining the position of the vehicle comprises:

determining the position of the vehicle to be a position which deviates from a previously determined position of the vehicle by no more than a threshold value.

16. The method as claimed in claim 11, wherein determining the position of the vehicle comprises:

determining the position of the vehicle by executing a computer program.

17. The method as claimed in claim 16, wherein determining the position of the vehicle comprises:

executing the computer program with a controller by executing control commands stored in a non-transitory machine-readable memory medium.

18. An apparatus configured to determine a corrected position for a vehicle, comprising:

a machine-readable memory;

a communication interface; and a computing unit operably connected to the machine-readable memory and the communication interface, and configured to execute control commands stored in the machine readable memory to read in at least one position data signal through the communication interface, wherein the at least one position data signal represents a position of an antenna device of one or more of a third-party vehicle and a high-rise building, read in satellite data that represent a satellite-based position of the vehicle, determine a satellite used for reading in the satellite data is obscured based on at least one of a height of the third-party vehicle and a height of the high-rise building;

determine the corrected position of the vehicle by correcting the satellite-based position of the vehicle based on the read-in at least one position data signal when the satellite used for reading in the satellite data is obscured, and provide a position signal to a control device of the vehicle based on the corrected position of the vehicle.

19. The method as claimed in claim 18, wherein the building is a multi-floor, vertically-oriented building.

* * * * *